(12) United States Patent
Van Vliet et al.

(10) Patent No.: US 12,219,355 B2
(45) Date of Patent: *Feb. 4, 2025

(54) DEVICE-BASED IDENTIFICATION FOR AUTOMATED USER DETECTION

(71) Applicant: Amazon Technologies, Inc., Seattle, WA (US)

(72) Inventors: Scott Edward Van Vliet, Las Flores, CA (US); Jeremy Daniel Johnson, Mission Viejo, CA (US); Stefan K Yap, Brea, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,411

(22) Filed: Jun. 10, 2022

(65) Prior Publication Data
US 2022/0303774 A1    Sep. 22, 2022

Related U.S. Application Data

(63) Continuation of application No. 14/637,175, filed on Mar. 3, 2015, now Pat. No. 11,363,460.

(51) Int. Cl.
*H04W 12/08* (2021.01)
*H04L 9/40* (2022.01)
*H04W 4/80* (2018.01)

(52) U.S. Cl.
CPC ......... *H04W 12/08* (2013.01); *H04L 63/0853* (2013.01); *H04W 4/80* (2018.02)

(58) Field of Classification Search
CPC ...... H04W 12/08; H04W 4/80; H04L 63/0853
(Continued)

(56) References Cited

U.S. PATENT DOCUMENTS 5,867,561 A * 2/1999 Strasser ................. H05G 1/30
378/114
6,438,579 B1 8/2002 Hosken
(Continued)

FOREIGN PATENT DOCUMENTS

CN 105894721 8/2016
JP 2004274849 A * 9/2004
(Continued)

OTHER PUBLICATIONS

Puttaswamy, Krishna PN, Shiyuan Wang, Troy Steinbauer, Divyakant Agrawal, Amr El Abbadi, Christopher Kruegel, and Ben Y. Zhao. "Preserving location privacy in geosocial applications." IEEE Transactions on Mobile Computing 13, No. 1 (2012): 159-173. (Year: 2012).*

(Continued)

*Primary Examiner* — Luu T Pham
*Assistant Examiner* — Walter J Malinowski
(74) *Attorney, Agent, or Firm* — S. Scott Foster; Kowert, Hood, Munyon, Rankin & Goetzel, P.C.

(57) ABSTRACT

A content consumption system or device may implement device-enabled identification for automated user detection. An identifying device may be detected at a content consumption device as within proximity of the content consumption device. An identifying device may be a mobile or wearable computing device, in various embodiments. A user account associated with the identification device may be selected for accessing content at the content consumption device. Access to content may be provided according to the selected user account. In some embodiments, content recommendations or content filtering may be performed based on the automatically determined user account.

20 Claims, 7 Drawing Sheets

(58) Field of Classification Search
USPC .................................................................. 726/4
See application file for complete search history.

(56) References Cited

U.S. PATENT DOCUMENTS

| | | | |
|---|---|---|---|
| 6,675,384 B1 | 1/2004 | Block et al. | |
| 6,934,748 B1 | 8/2005 | Louviere et al. | |
| 7,640,272 B2 | 12/2009 | Mahajan et al. | |
| 7,644,400 B2 | 1/2010 | Harris et al. | |
| 7,751,909 B2 | 7/2010 | Ramsey et al. | |
| 8,079,042 B2 | 12/2011 | Foti et al. | |
| 8,218,080 B2 | 7/2012 | Xu et al. | |
| 8,301,770 B2 | 10/2012 | van Coppenolle et al. | |
| 8,384,555 B2 | 2/2013 | Rosen | |
| 8,396,452 B1 | 3/2013 | Matsuoka | |
| 8,630,741 B1 | 1/2014 | Matsuoka et al. | |
| 8,754,992 B1 * | 6/2014 | Schulze | H04N 21/42226 |
| | | | 725/132 |
| 8,798,323 B2 | 8/2014 | Soderstrom | |
| 8,914,837 B2 | 12/2014 | Ahmed et al. | |
| 8,934,748 B2 | 1/2015 | Rice et al. | |
| 9,113,317 B2 | 8/2015 | Sagayaraj et al. | |
| 9,241,187 B2 | 1/2016 | Ricci | |
| 9,288,387 B1 | 3/2016 | Keller | |
| 9,380,039 B2 * | 6/2016 | Wildermuth | H04L 63/08 |
| 9,729,551 B1 | 8/2017 | Karunakaran | |
| 10,382,964 B2 * | 8/2019 | Azam | H04W 12/08 |
| 10,757,216 B1 | 8/2020 | Van Vliet et al. | |
| 11,363,460 B1 | 6/2022 | Van Vliet et al. | |
| 2003/0066071 A1 | 4/2003 | Gutta et al. | |
| 2003/0100315 A1 | 5/2003 | Rankin | |
| 2004/0003392 A1 | 1/2004 | Trajkovic et al. | |
| 2004/0081144 A1 | 4/2004 | Martin et al. | |
| 2004/0117442 A1 * | 6/2004 | Thielen | H04L 65/1101 |
| | | | 709/219 |
| 2005/0060157 A1 | 3/2005 | Daugherty et al. | |
| 2005/0097595 A1 | 5/2005 | Lipsanen et al. | |
| 2006/0005256 A1 | 1/2006 | Cox | |
| 2006/0023915 A1 | 2/2006 | Aalbu et al. | |
| 2006/0087554 A1 | 4/2006 | Boyd et al. | |
| 2006/0107281 A1 * | 5/2006 | Dunton | H03J 1/0025 |
| | | | 725/38 |
| 2006/0236097 A1 | 10/2006 | Prologo et al. | |
| 2007/0111748 A1 | 5/2007 | Risbood | |
| 2007/0122111 A1 | 5/2007 | Yamamoto et al. | |
| 2007/0126884 A1 | 6/2007 | Xu et al. | |
| 2007/0162971 A1 | 7/2007 | Blom et al. | |
| 2007/0165812 A1 | 7/2007 | Lee et al. | |
| 2007/0180485 A1 | 8/2007 | Dua | |
| 2007/0213100 A1 | 9/2007 | Osann, Jr. | |
| 2007/0297112 A1 * | 12/2007 | Gilbert | G06F 1/266 |
| | | | 361/91.5 |
| 2008/0039205 A1 | 2/2008 | Ackley et al. | |
| 2008/0133334 A1 | 6/2008 | Ullah | |
| 2008/0141293 A1 | 6/2008 | Blanchard et al. | |
| 2008/0160984 A1 | 7/2008 | Benes et al. | |
| 2008/0174551 A1 * | 7/2008 | Ishibashi | H04N 21/42204 |
| | | | 345/158 |
| 2008/0214145 A1 | 9/2008 | Howard et al. | |
| 2008/0235739 A1 | 9/2008 | Coebergh Van Den Braak | |
| 2008/0313548 A1 * | 12/2008 | Krzyzanowski | G08C 17/00 |
| | | | 715/748 |
| 2009/0044225 A1 | 2/2009 | Lin et al. | |
| 2009/0125971 A1 | 5/2009 | Belz et al. | |
| 2009/0133051 A1 | 5/2009 | Hildreth | |
| 2009/0135051 A1 * | 5/2009 | Bishop | G01S 13/867 |
| | | | 342/175 |
| 2009/0138805 A1 * | 5/2009 | Hildreth | H04N 21/4751 |
| | | | 715/745 |
| 2009/0161871 A1 * | 6/2009 | Chaudhry | H04L 9/32 |
| | | | 380/270 |
| 2009/0176509 A1 | 7/2009 | Davis et al. | |
| 2009/0209293 A1 | 8/2009 | Louch | |
| 2009/0217356 A1 | 8/2009 | Scott et al. | |
| 2009/0248607 A1 | 10/2009 | Eggink et al. | |
| 2009/0285492 A1 | 11/2009 | Ramanujapuram et al. | |
| 2010/0080414 A1 | 4/2010 | Nonaka | |
| 2010/0130182 A1 | 5/2010 | Rosen | |
| 2010/0180009 A1 | 7/2010 | Callahan | |
| 2010/0190481 A1 | 7/2010 | Nath et al. | |
| 2010/0199105 A1 | 8/2010 | Lee | |
| 2010/0250327 A1 | 9/2010 | Relyea, Jr. et al. | |
| 2010/0262712 A1 | 10/2010 | Kim et al. | |
| 2010/0268821 A1 | 10/2010 | Pau et al. | |
| 2010/0315279 A1 * | 12/2010 | Hamai | G08C 23/04 |
| | | | 341/176 |
| 2010/0325194 A1 | 12/2010 | Williamson et al. | |
| 2011/0003582 A1 | 1/2011 | Park et al. | |
| 2011/0022447 A1 | 1/2011 | Pelaic | |
| 2011/0062794 A1 | 3/2011 | Vergoossen et al. | |
| 2011/0320380 A1 | 3/2011 | Zahn et al. | |
| 2011/0125777 A1 | 5/2011 | Begeja et al. | |
| 2011/0141114 A1 | 6/2011 | Chen et al. | |
| 2011/0145648 A1 * | 6/2011 | Garcia-Tobin | G06F 11/324 |
| | | | 714/45 |
| 2011/0173229 A1 | 7/2011 | Choudhury et al. | |
| 2011/0201280 A1 * | 8/2011 | Dolfini | H04W 4/02 |
| | | | 455/67.11 |
| 2011/0207440 A1 | 8/2011 | Ruuspakka et al. | |
| 2011/0237324 A1 | 9/2011 | Clavin et al. | |
| 2012/0060176 A1 | 3/2012 | Chai et al. | |
| 2012/0071132 A1 | 3/2012 | Carlander | |
| 2012/0131098 A1 * | 5/2012 | Wood | H04N 21/4722 |
| | | | 709/203 |
| 2012/0134548 A1 * | 5/2012 | Rhoads | G06Q 20/3276 |
| | | | 398/115 |
| 2012/0158775 A1 | 6/2012 | Choi et al. | |
| 2012/0191726 A1 | 7/2012 | Markus et al. | |
| 2012/0280901 A1 | 11/2012 | Kim | |
| 2012/0330544 A1 | 12/2012 | Joong et al. | |
| 2013/0007874 A1 | 1/2013 | Purvis | |
| 2013/0081081 A1 * | 3/2013 | Wang | H04N 21/25875 |
| | | | 725/38 |
| 2013/0082662 A1 * | 4/2013 | Carre | H02J 7/0068 |
| | | | 320/134 |
| 2013/0097101 A1 * | 4/2013 | Ortiz | G06Q 30/02 |
| | | | 706/46 |
| 2013/0117381 A1 | 5/2013 | Garcia et al. | |
| 2013/0130669 A1 | 5/2013 | Xiao et al. | |
| 2013/0157607 A1 | 6/2013 | Paek et al. | |
| 2013/0174223 A1 | 7/2013 | Dykeman et al. | |
| 2013/0218905 A1 | 8/2013 | Sankarasubramaniam et al. | |
| 2013/0339991 A1 | 10/2013 | Ricci | |
| 2013/0297706 A1 | 11/2013 | Arme et al. | |
| 2013/0324160 A1 | 12/2013 | Sabatellil et al. | |
| 2013/0325655 A1 | 12/2013 | Wouhaybi et al. | |
| 2014/0007205 A1 | 1/2014 | Oikonomou | |
| 2014/0026201 A1 | 1/2014 | Srinivasan et al. | |
| 2014/0040989 A1 * | 2/2014 | Davis | H04L 63/10 |
| | | | 726/4 |
| 2014/0068645 A1 | 3/2014 | Badros et al. | |
| 2014/0082147 A1 * | 3/2014 | Pazos | H04L 67/62 |
| | | | 709/219 |
| 2014/0082208 A1 | 3/2014 | Ojanpera | |
| 2014/0096180 A1 | 4/2014 | Negi et al. | |
| 2014/0109184 A1 | 4/2014 | Parker, II | |
| 2014/0123257 A1 | 5/2014 | Gordon et al. | |
| 2014/0172691 A1 * | 6/2014 | Raman | G06Q 20/1235 |
| | | | 705/39 |
| 2014/0173051 A1 | 6/2014 | Sagayaraj et al. | |
| 2014/0181535 A1 | 6/2014 | Smith et al. | |
| 2014/0181910 A1 * | 6/2014 | Fingal | H04L 63/107 |
| | | | 726/4 |
| 2014/0223467 A1 | 8/2014 | Hayton et al. | |
| 2014/0230018 A1 * | 8/2014 | Anantharaman | H04L 12/2816 |
| | | | 726/4 |
| 2014/0232903 A1 | 8/2014 | Oshima et al. | |
| 2014/0244009 A1 * | 8/2014 | Mestas | G16H 40/63 |
| | | | 700/91 |
| 2014/0274007 A1 | 9/2014 | Detter et al. | |
| 2014/0274185 A1 | 9/2014 | Luna et al. | |
| 2014/0359647 A1 | 12/2014 | Shoemake et al. | |
| 2014/0372228 A1 | 12/2014 | Paz-Pujalt | |

(56) References Cited

U.S. PATENT DOCUMENTS

| | | |
|---|---|---|
| 2015/0036573 A1* | 2/2015 | Malik .................. G08C 17/02 |
| | | 370/311 |
| 2015/0039748 A1 | 2/2015 | Draznin et al. |
| 2015/0067714 A1 | 3/2015 | Bhogal et al. |
| 2015/0074800 A1 | 3/2015 | Farraro |
| 2015/0088253 A1* | 3/2015 | Doll .................. G01R 31/3835 |
| | | 623/6.22 |
| 2015/0095933 A1* | 4/2015 | Blackburn ....... H04N 21/42203 |
| | | 725/25 |
| 2015/0149366 A1* | 5/2015 | Schafer ........... H04N 21/42209 |
| | | 705/304 |
| 2015/0177939 A1 | 6/2015 | Anderson et al. |
| 2015/0178769 A1* | 6/2015 | Mirisola ........... G06Q 30/0246 |
| | | 705/14.45 |
| 2015/0186535 A1 | 7/2015 | Patil et al. |
| 2015/0189426 A1 | 7/2015 | Pang |
| 2015/0195675 A1 | 7/2015 | Larkin et al. |
| 2015/0281302 A1 | 10/2015 | Winston et al. |
| 2015/0281767 A1 | 10/2015 | Adimatyam et al. |
| 2015/0382047 A1 | 12/2015 | Van Os et al. |
| 2016/0005003 A1 | 1/2016 | Norris et al. |
| 2016/0005012 A1 | 1/2016 | Goetz et al. |
| 2016/0036939 A1 | 2/2016 | Freund et al. |
| 2016/0044385 A1 | 2/2016 | Kareeson et al. |
| 2016/0088358 A1 | 3/2016 | Garcia Navarro |
| 2016/0094939 A1* | 3/2016 | Guy .................. H04W 52/0254 |
| | | 455/456.2 |
| 2016/0121161 A1 | 5/2016 | Mountain |
| 2016/0142783 A1 | 5/2016 | Bagga et al. |
| 2016/0173929 A1 | 6/2016 | Klappert et al. |
| 2016/0182502 A1 | 6/2016 | Smith et al. |
| 2016/0205344 A1 | 7/2016 | Suzuki et al. |
| 2017/0372228 A1 | 12/2017 | Daly et al. |
| 2020/0150735 A1 | 5/2020 | Agrawal et al. |

FOREIGN PATENT DOCUMENTS

| | | | | |
|---|---|---|---|---|
| JP | 2006339866 A | * | 12/2006 | |
| WO | WO-2006053324 A1 | * | 5/2006 | ......... G07C 9/00158 |
| WO | 2007009252 | | 1/2007 | |

OTHER PUBLICATIONS

Knappmeyer, Michael, Saad Liaquat Kiani, Eike Steffen Reetz, Nigel Baker, and Ralf Tonjes. "Survey of context provisioning middleware." IEEE Communications Surveys & Tutorials 15, No. 3 (2013): 1492-1519. (Year: 2013).*

De Vleeschauwer, Danny, Chris Hawinkel, and Yannick Le Louédec. "Determining leaders and clusters in video consumption." In Proceedings of the 9th International Conference on Network and Service Management (CNSM 2013), pp. 382-385. IEEE, 2013. (Year: 2013).*

Lima, Joao Carlos D., Cristiano C. Rocha, and Iara Augustin. "A context-aware recommendation system to behavioral based authentication in mobile and pervasive environments." In 2011 IFIP 9th International Conference on Embedded and Ubiquitous Computing, pp. 312-319. IEEE, 2011. (Year: 2011).*

Otebolaku, Abayomi Moradeyo, and Maria Teresa Andrade. "Supporting context-aware cloud-based media recommendations for smartphones." In 2014 2nd IEEE International Conference on Mobile Cloud Computing, Services, and Engineering, pp. 109-116. IEEE, 2014. (Year: 2014).*

Dedrick, "Interactive Electronic Advertising", IEEE, 1994, pp. 55-66.

* cited by examiner

DEVICE-BASED IDENTIFICATION FOR AUTOMATED USER DETECTION

This application is a continuation of U.S. patent application Ser. No. 14/637,175, filed Mar. 3, 2015, which is hereby incorporated by reference herein its entirety.

BACKGROUND

Consumer choices for goods and services have grown exponentially upon the advent of the digital age. E-commerce, content distribution networks, and other communication technologies have enabled customers to choose from many more goods than were previously available to them. However, navigating the sheer number products now available can prove daunting and ultimately discourage some customers from making purchases using these new means. Recommendation systems have been developed in order to provide customers with some assistance when choosing new products. A recommendation system may provide feedback or recommended items to a customer so that the customer may make a more informed decision as to whether or not an item may be a good purchase.

In order to create effective item recommendation systems, large amounts of past behavior of customers may be tracked and maintained. This customer data may be maintained according to a particular user account or user profile and analyzed in order to make suggestions of items that, for example, other similar customers have purchased. In order to provide good item recommendations, however, customer data may need to be accurately attributed to the correct user account. However, some fulfillment systems or services may be susceptible to inaccurate attribution as it may depend upon a user to ensure that the correct user account is identified. In scenarios where multiple users may utilize a common system or device to make purchases, selections, or provide other behavioral input that is tracked, accurate attribution of tracked data may be difficult when relying upon manual switching between user accounts.

Figure 1:
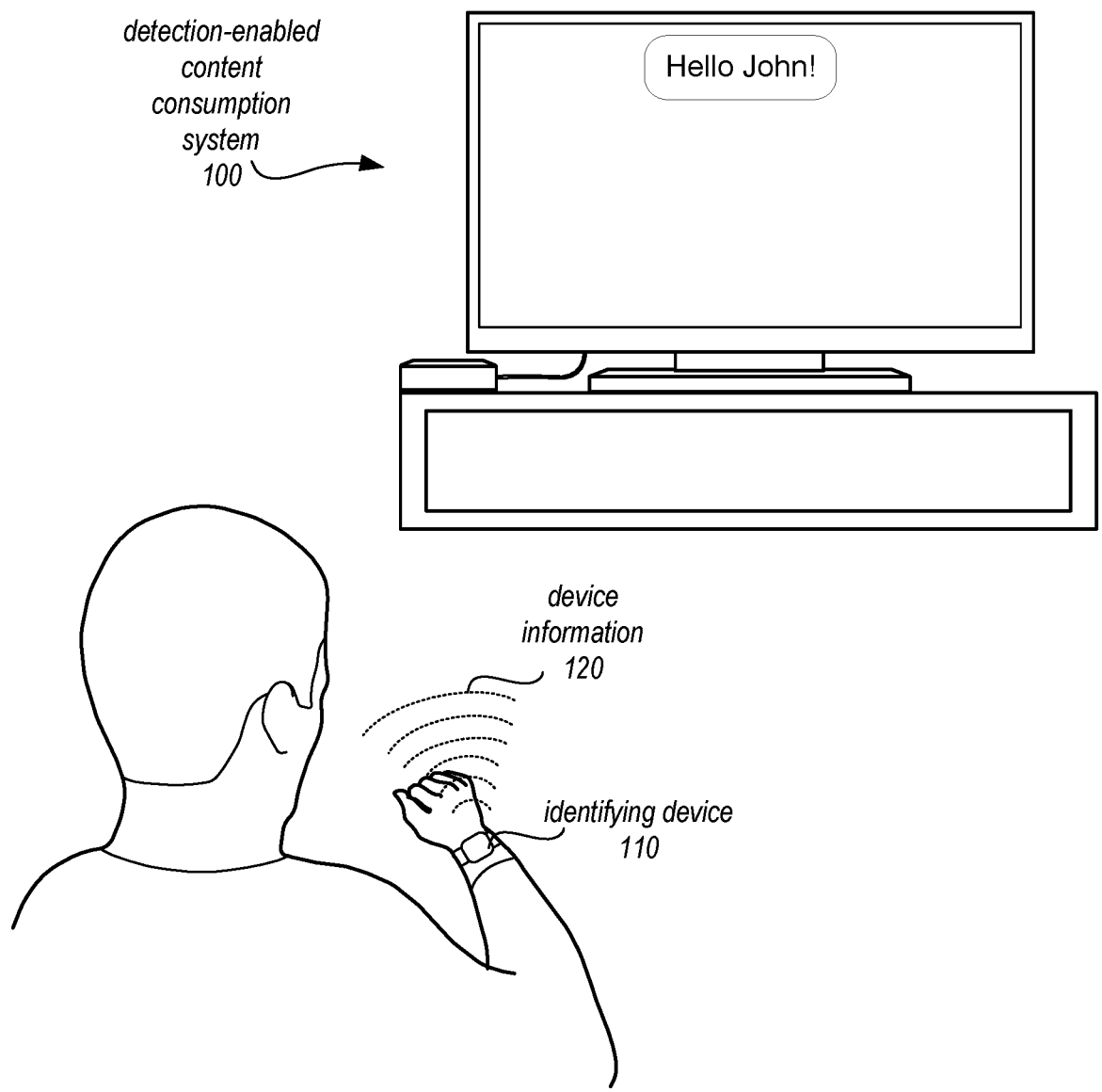
FIG. 1 is a diagram illustrating device-enabled identification for automated user detection, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, (f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of device-enabled identification for automated user detection are described herein. User accounts (or user profiles) may provide a point of organization for different systems, services, and/or devices that provide content (e.g., audio, visual, interactive, etc.) to provide access to the content for a user. Different rights, authorizations, agreements, controls, settings, and other information used to access content may be associated with particular user accounts so that a content consumption device (e.g., a content streaming device or other device that obtains and makes content available to a user) may provide content access to a user according to a user account. Additionally, various user experience optimizations may be implemented based on information, such as historical behavioral data associated with a user account, in order to provide content recommendations and other tailored information to a user.

Some content consumption devices may be utilized by multiple different users. For example, a single content consumption device implemented as part of an entertainment system, displaying audio, visual, and interactive content via a display (e.g., a television) may be utilized by multiple different users. Respective user accounts may be setup for the different users. However, typically, users themselves may have to manually enter account information in order to switch between different user accounts at the content consumption device. If user account switching is not accurately performed, then behavioral data collected may be misattributed to an incorrect user account (which may reduce the effectiveness of user experience optimizations such as content recommendations). Device-enabled identification for automated user detection may automatically select user accounts, providing an accurate and automated mechanism to switch between user accounts.

FIG. 1 is a diagram illustrating device-enabled identification for automated user detection, according to some embodiments. Detection-enabled content consumption system 100 may be one or more devices, such as a computing system described below with regard to FIG. 7, which may be configured to implemented device-enabled identification for automated user detection, such as discussed below with regard to FIGS. 2, 4-6. Detection-enabled content consumption system 100 may be configured to provide access to content according to a selected user account (which may include providing access to certain content based on user account settings and/or content recommendations based on historical content access data specific to the user account). In various embodiments, detection-enabled content consumption system 100 may be configured to detect an identifying device that is within a consumption proximity of detection-enabled content consumption system 100. For instance, as illustrated in FIG. 1, identifying device 110 may be a device configured to provide device information 120 which may be received as one or more wireless communications at detection-enabled content consumption system 100. For example, identifying device 110 may broadcast device information including a device identifier via a radio protocol such as Bluetooth Low Energy (BLE). Please note, that in some embodiments, identifying device 110 may respond to a request for identifying information 120 from detection-enabled content consumption system 100.

Based on the device information 120, detection-enabled content consumption device 100 may be configured to determine whether identifying device 110 is within consumption proximity of detection-enabled content consumption system 100. Consumption proximity may, in various embodiments, identify a location, area, or range in which content may be consumed. For instance, in FIG. 1, consumption proximity may be the area, such as room in which detection enabled content consumption system 100 is located, and in which a user, such as the user wearing identifying device 110, may be able to see visual content displayed at detection-enabled content consumption system 100. Identifying devices, such as identifying device 110, may serve as a proxy for the presence of a user in various embodiments. Determining that an identifying device is within consumption proximity may allow a detection-enabled content consumption system to determine that a particular user is present and able to consume content. For example, a distance between identifying device 110 and detection-enabled consumption system 100 may be determined and compared within one or more locality rules, which may describe distances which are considered to be within consumption proximity. Other locality rules may be used to further distinguish between identifying devices present within consumption proximity and those devices detected but which are not within consumption proximity.

In response to determining that identifying device 110 is within consumption proximity, detection-enabled content consumption system 100 may be configured to select a user account linked to or associated with the identifying device. For example, mapping information may be maintained that links identifying devices to user accounts. Once a user account is selected, access to content may be provided according to the selected user account automatically, without requiring any manual identification input from a user. Various content recommendations, settings, actions, permissions, or other user optimizations or experiences may be provided in accordance within information associated with the identified user account.

Please note, FIG. 1 is provided as an example illustration of device-enabled identification for automated user detection, and is not intended to be limiting as to the physical arrangement, size, or number of components, modules, or devices, implementing device-enabled identification for automated user detection or an identifying device. For example, in some embodiments, the identifying device may be mobile phone or tablet computing device.

The specification next describes an example content consumption device which may implement device-enabled identification for automated user detection and a network-based content service which may provide content for the content consumption device. The specification then describes various flowcharts for implementing different techniques to provide device-enabled identification for automated user detection. An example computer system upon which the described systems, devices, and techniques may be implemented is then described.

Figure 2:
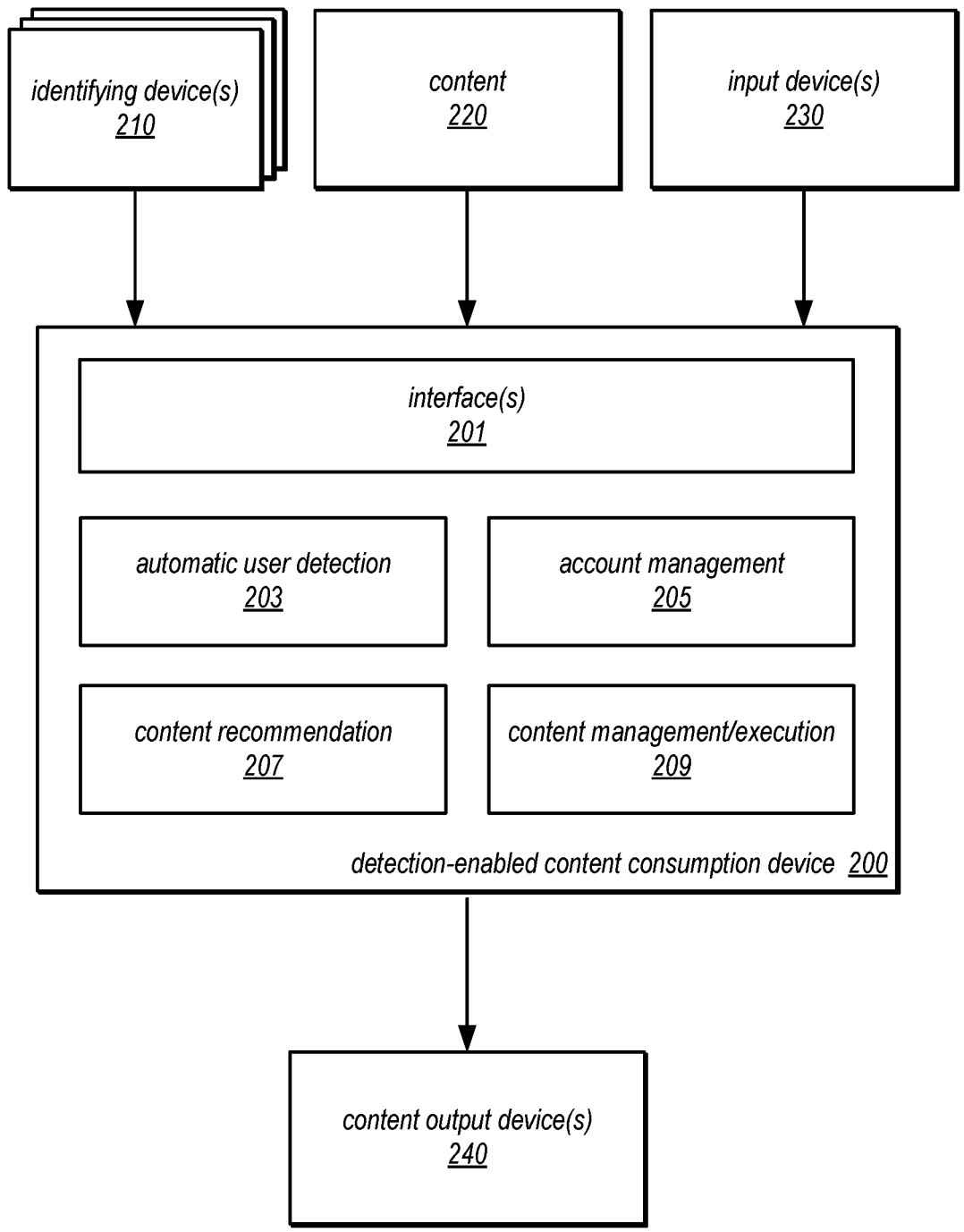
FIG. 2 is a logical block diagram illustrating a content consumption system, according to some embodiments.

FIG. 2 is a logical block diagram illustrating a content consumption system, according to some embodiments. Detection-enabled content consumption device 200 may be implemented in hardware and/or software on one or more computing devices, such as computing system 1000 described below with regard to FIG. 7. Detection-enabled content consumption device 200 may implement one or more interface(s) 201, which may allow communication according to different protocols, technologies, or mediums. For example, identifying device(s) 210 may communicate via various types of radio wave communication protocols and techniques (e.g., Bluetooth, Bluetooth Low Energy (BLE), Z-Wave, ZigBee, XBee), infrared communications, Wi-Fi communications, or any other Wireless Personal Area Network (WPAN) communications may be utilized to provide device information between identifying devices and a content consumption device. Respective interface(s) 201 may be configured to receive the communications from identifying device(s) 210. Similarly, in some embodiments, content 220 may be stored external to detection-enabled content consumption device 200 (although in some embodiments it may be locally stored). Interface(s) 210 may be configured to access and/or receive content 220 (e.g., over a network connection). Input device(s) 230 may also provide information via interface(s) 201, such as remote control sending infrared signals, HTML-based requests over a network connection, or any other type of input (including wired inputs, such as keyboards, mice, other I/O devices).

Figure 5:
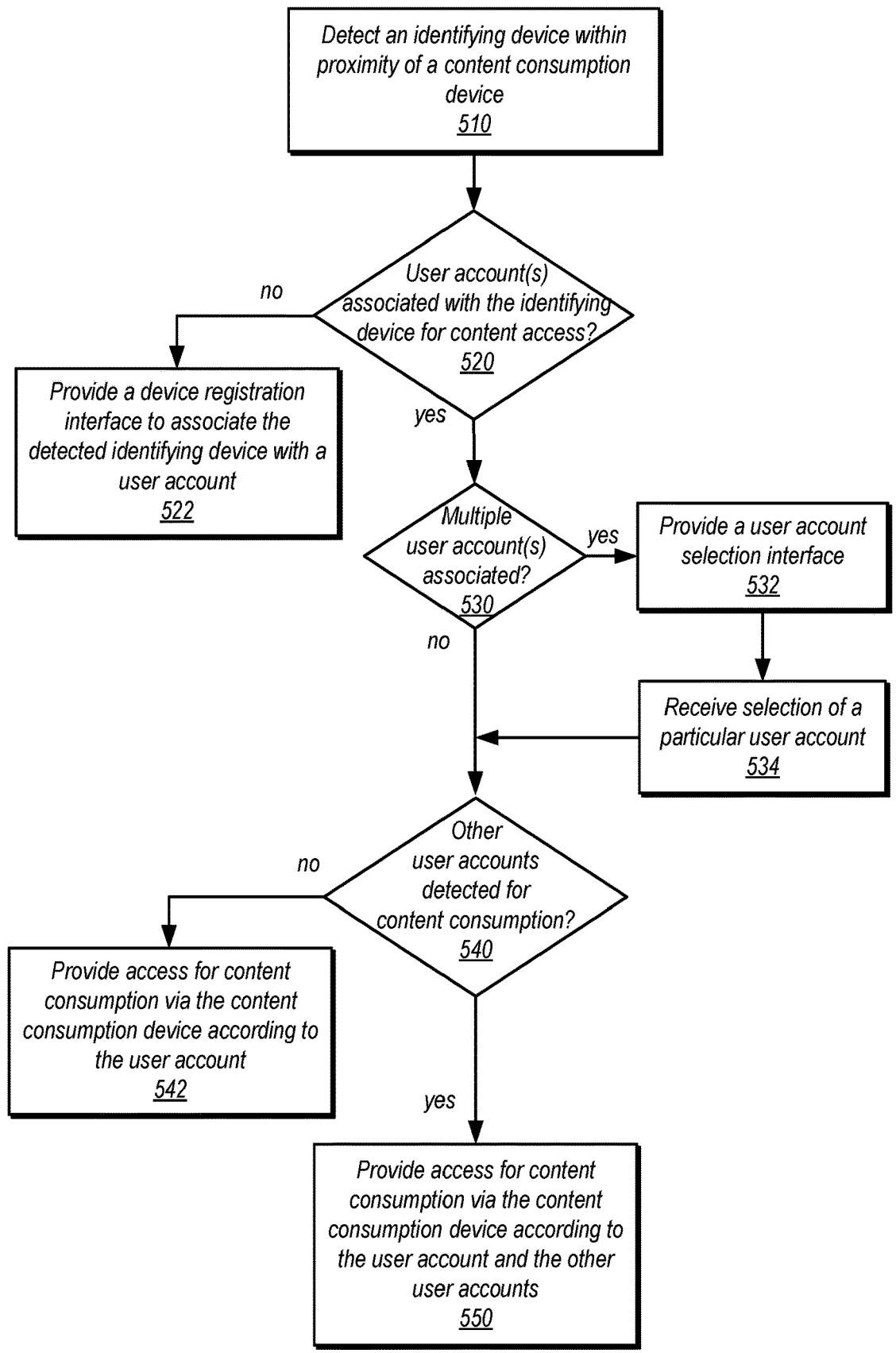
FIG. 5 is a high-level flowchart illustrating methods and techniques for implementing device-enabled identification for automated user detection, according to some embodiments.
Figure 6:
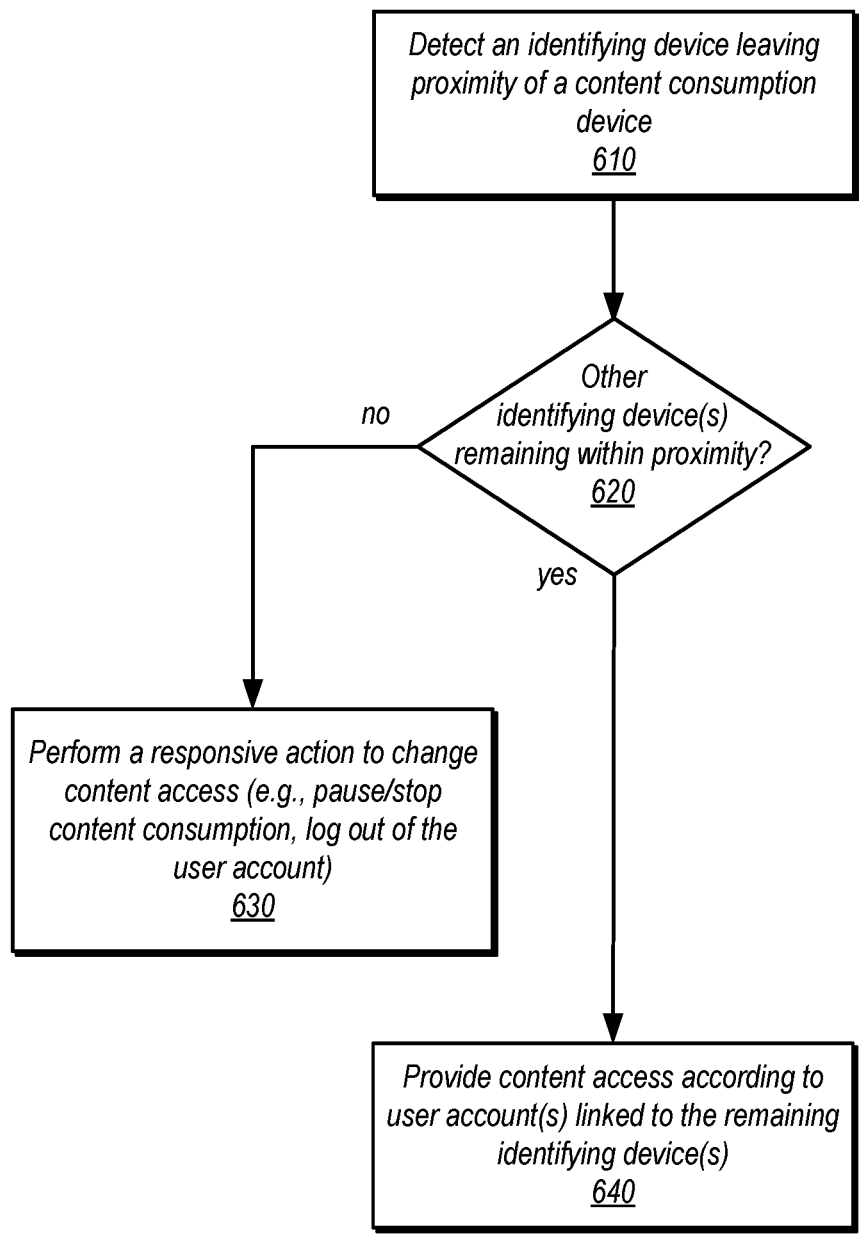
FIG. 6 is a high-level flowchart illustrating methods and techniques for identifying devices leaving consumption proximity of a content consumption device, according to some embodiments.

In some embodiments, detection-enabled content consumption device 200 may implement automatic user detection module 203 which may be configured to perform the various techniques described below with regard to FIGS. 5 and 6. For example, automatic user detection 203 may detect an identifying device 210 based on wireless communications conveying device information, determine that the identifying device 210 is within consumption proximity of the detection-enabled content consumption device 200, and select a user account linked to or associated with the identifying device. In at least some embodiments, automatic user detection 203 may handle manual input of user account information from input device(s) 230 to manually select a user account. Automatic user detection 203 may be configured to select user accounts even if a back-end service, system or device, such as described below with regard to FIG. 3 is unavailable or offline.

In some embodiments, detection-enabled content consumption device 200 may implement account management module 205 to manage user account operations (e.g., creation, changes, or deletion). For example, user accounts may have various associated information, profile information, settings or permissions, purchasing information (e.g., financial account information), or other information that informs the access to and consumption of content via the content consumption device. In some embodiments, a particular user account may be blocked from certain actions (e.g., consuming certain content or purchasing certain items) and/or controlled by another user account (e.g., a parental account or owner account may set up subordinate user accounts to the owner account, such as children accounts). In some embodiments, detection-enabled content consumption device 200 may implement content recommendation module 207 to provide content recommendations specific to a user account based, at least in part, on historical account access data (e.g., content selections, ratings, qualities, etc. . . . ) specific to a user account. In some embodiments, some or all of account management 205 and content recommendation 207 functionalities may be provided by a content service, such as network-based content service 300 in FIG. 3. In some embodiments, detection-enabled content consumption device 200 may implement content management/execution module 209 to provide access to content according to a selected user account (e.g., enforcing account restrictions, request content recommendations, etc. . . . ). Content management/execution module 209 may implement various components, devices, or techniques to create, render, construct, generate, or otherwise provide content (e.g., according to various types of content media, such as decoding media files for display). In some embodiments, content management/execution module 209 may obtain and provide content to content output devices 240 for consumption. Content output devices may be, in some embodiments, audio, visual, and or interactive output devices.

The systems described herein may, in some embodiments, implement a network-based content service that provides content to customers or clients (which may be users). The content may be used, purchased, rented, or otherwise consumed. Selection of content may correspond to one of these actions and/or rating or reviewing particular content. Some embodiments of a network-based content service are illustrated in FIG. 3. In the illustrated embodiment, a number of clients (shown as clients 350a-350n) may be configured to interact with a network-based content service 300 via a network 360. Clients may be detection-enabled content consumption device(s) in some embodiments. An interface (e.g., a network-based site, such as a website, and/or a programmatic interface, such as may be programmatically accessible to a content consumption device) 310 may handle or communicate with clients 350. Control plane 320 may be configured to handle processing, management, and other techniques necessary to provide the requested content to clients 350. Data store 330 may maintain information for the network-based content service 300. Content fulfillment 340 may be either the physical or digital resources (content) provided to clients 350 upon selection. It is noted that where one or more instances of a given component may exist, reference to that component herein may be made in either the singular or the plural. However, usage of either form is not intended to preclude the other.

Figure 3:
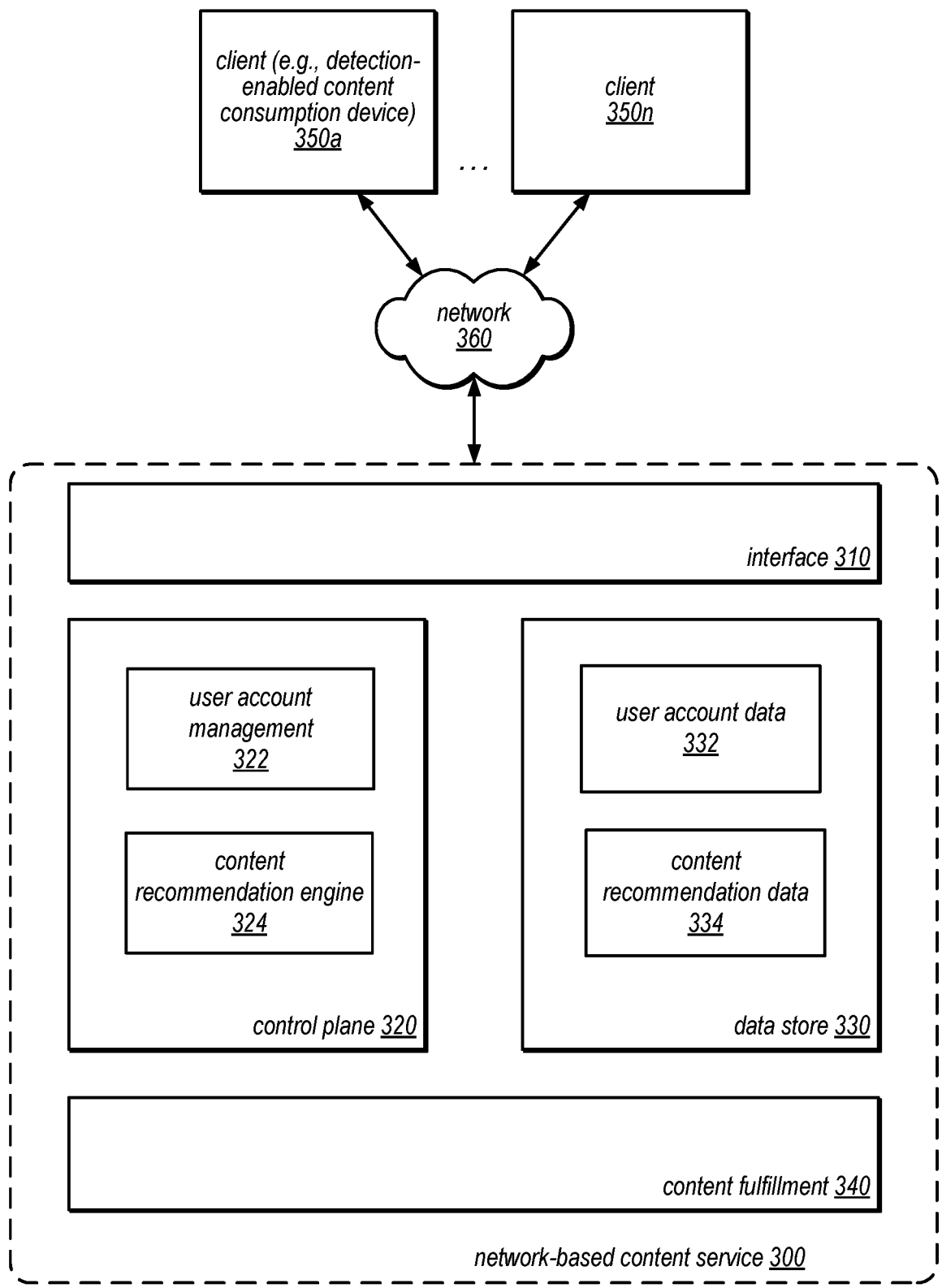
FIG. 3 is a logical block diagram illustrating a network-based content service implementing user accounts detected via device-enabled identification for automated user detection at content consumption devices, according to some embodiments.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 7 and described below. In various embodiments, the functionality of a given system component (e.g., content recommendation engine 324) may be implemented by a particular node or may be distributed across several nodes. In some embodiments, a given node may implement the functionality of more than one system component (e.g., more than control plane 320 component).

Generally speaking, clients 350 may encompass any type of client or other component configurable to submit network-based requests to network-based content service 300 via network 360, including requests to select particular content offered. In some embodiments, clients may receive and consume content directly (without a content consumption device). For example, a given client 350 may include a suitable version of a web browser, or may include a plug-in module or other type of code module configured to execute as an extension to or within an execution environment provided by a web browser. For example, selection of content for purchase and submitting payment information may be conveyed via the web browser. Alternatively, a client 350 (e.g., a gaming client) may encompass a detection-enabled content consumption device, configured to perform various interactions as described below in FIG. 4. In some embodiments, such a content consumption device may include sufficient protocol support (e.g., for a suitable version of Hypertext Transfer Protocol (HTTP)) for generating and processing network-based requests without necessarily implementing full browser support for all types of network-based data. That is, client 350 may interact directly with network-based content service 300 (or interface 310). In some embodiments, client 350 may be configured to generate network-based requests according to a Representational State Transfer (REST)-style network-based architecture, a document- or message-based network-based architecture, or another suitable network-based architecture.

Clients 350 may convey network-based requests (e.g., content selection requests, device registration requests, etc.) to and receive responses from network-based content service 300 via network 360. In various embodiments, network 360 may encompass any suitable combination of networking hardware and protocols necessary to establish network-based-based communications between client 350 and network-based content service 300 (and/or enterprise interface 310). For example, network 360 may generally encompass the various telecommunications networks and service providers that collectively implement the Internet. Network 360 may also include private networks such as local area networks (LANs) or wide area networks (WANs) as well as public or private wireless networks. For example, both a given client 350 and network-based content service 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and network-based content service 300. It is noted that in some embodiments, client 350 may communicate with network-based content service 300 using a private network rather than the public Internet. For example, client 350 may via a private network as part of selecting and receiving digital items offered by network-based content service 300. In such a case, clients 350 may communicate with service 300 entirely through a private network 360 (e.g., a LAN or WAN that may use Internet-based communication protocols but which is not publicly accessible).

Generally speaking, network-based content service 300 may be configured to implement interface 310 which may be configured to receive and process network-based requests, such as requests to select, browse, access, or otherwise interact with content offered, retrieve content, access user account data, and/or get content recommendations. For example, interface 310 may include hardware and/or software configured to implement a network-based site, such that a web browser or other component implemented on client 350 may be configured to receive information via the network-based site. In some embodiments, interface 310 may include an Application Programming Interface, which may allow a client 350, such as a content consumption device, to programmatically communicate with network-based content service 310, such as described below with regard to FIG. 4. Interface 310 may be implemented as a server system configured to receive network-based requests from clients 350 and to forward them to components of a system, such as control plane 320, that facilitate the offering, sale, distribution or other functionalities of the content offered by network-based content service 300. In other embodiments, interface 310 may be configured as a number of distinct systems (e.g., in a cluster topology) implementing load balancing and other request management features configured to dynamically manage large-scale network-based request processing loads. In various embodiments, interface 310 may be configured to support REST-style or document-based (e.g., SOAP-based) types of network-based requests.

Control plane 320 may be configured to facilitate the operations of network-based content service 300. For example, control plane 320 may coordinate the purchase, rental, access, sharing, metering and/or accounting of client usage/selection of content, which may be services, physical products, or digital media, in various embodiments. In at least some embodiments, network-based content service 300 may be a streaming content service (e.g. streaming audio or video content). Control plane 320 may implement financial accounting and billing systems, or may maintain a database of usage data that may be queried and processed by external systems for reporting and billing of customer activity. In certain embodiments, control plane 320 may be configured to collect, monitor and/or aggregate a variety of operational metrics, such as metrics reflecting the rates and types of requests received from customers 350, bandwidth utilized by such requests, system processing latency for such requests, system component utilization (e.g., network bandwidth and/or storage utilization within the network-based content service), rates and types of errors resulting from requests or any other suitable metrics. In some embodiments such metrics may be used by system administrators to tune and maintain system components, while in other embodiments such metrics (or relevant portions of such metrics) may be exposed to clients 350 to enable such customers to monitor their usage of services/items. Control plane may also implement various user and/or customer account functions which may be responsible for updating or maintaining customer/user account information. User information, such as a unique user identifier, may be linked to or associated with user account data 332 for customers/users maintained in data store 330.

In some embodiments, control plane 320 may also implement user authentication and access control procedures. For example, for a given network-based request to access a particular content, control plane 320 may be configured to ascertain whether the client 350 associated with the request is authorized to access the particular item. Control plane 320 may determine such authorization by, for example, evaluating an identity, password or other credential against credentials associated with the particular item, or evaluating the requested access to the particular item against an access control list for the particular item. Various access control policies may be stored as records or lists of access control information by control plane 320. In some embodiments, these access control policies may be implemented to accept or deny access to content offered by network-based content service 300 (e.g., some or all of streaming videos).

Data store 330 may be one or more storage nodes, systems, or servers configured to persistently store data for enterprise data store, such as the aforementioned user account data 332 and/or content recommendation data 334 (e.g., a content recommendation model). Various durability and/or security techniques may be implemented to ensure safe and reliable storage of sensitive information, such as payment information, accounts, or passwords.

Content fulfillment 340 may be one or more systems or devices configured to provide selected content to clients 350 that are offered by network-based content service 300. In some embodiments, content fulfillment 340 may be application servers, content distribution networks, application, gaming or other media platforms that provide access to or a copy of digital media selected by clients 350. For example, movies, television shows, or other audio/visual media may be streamed or downloaded to clients 350 for consumption as part of a network-based video streaming or gaming service. If access to or rights to an item is limited, content fulfillment 340 may be configured to enforce digital rights management (DRM) or other controls to enforce the policies of the items and their respective offers (e.g., rental or borrow of digital media for certain time periods).

As illustrated in FIG. 3, user account management 322 may be implemented to manage user account data 322. For example, requests to register identifying devices to a user account may be handled by user account management 322, which updates user account data 332 to create the new mapping. Similarly, content recommendation engine 324 may be configured to handle requests for content recommendations to particular user accounts based on content recommendation data 334 maintained in data store 334. For example, content recommendation data 334 may implement a data model which may be accessed and evaluated in order to determine content recommendations to be made for a specific user account.

Figure 4:
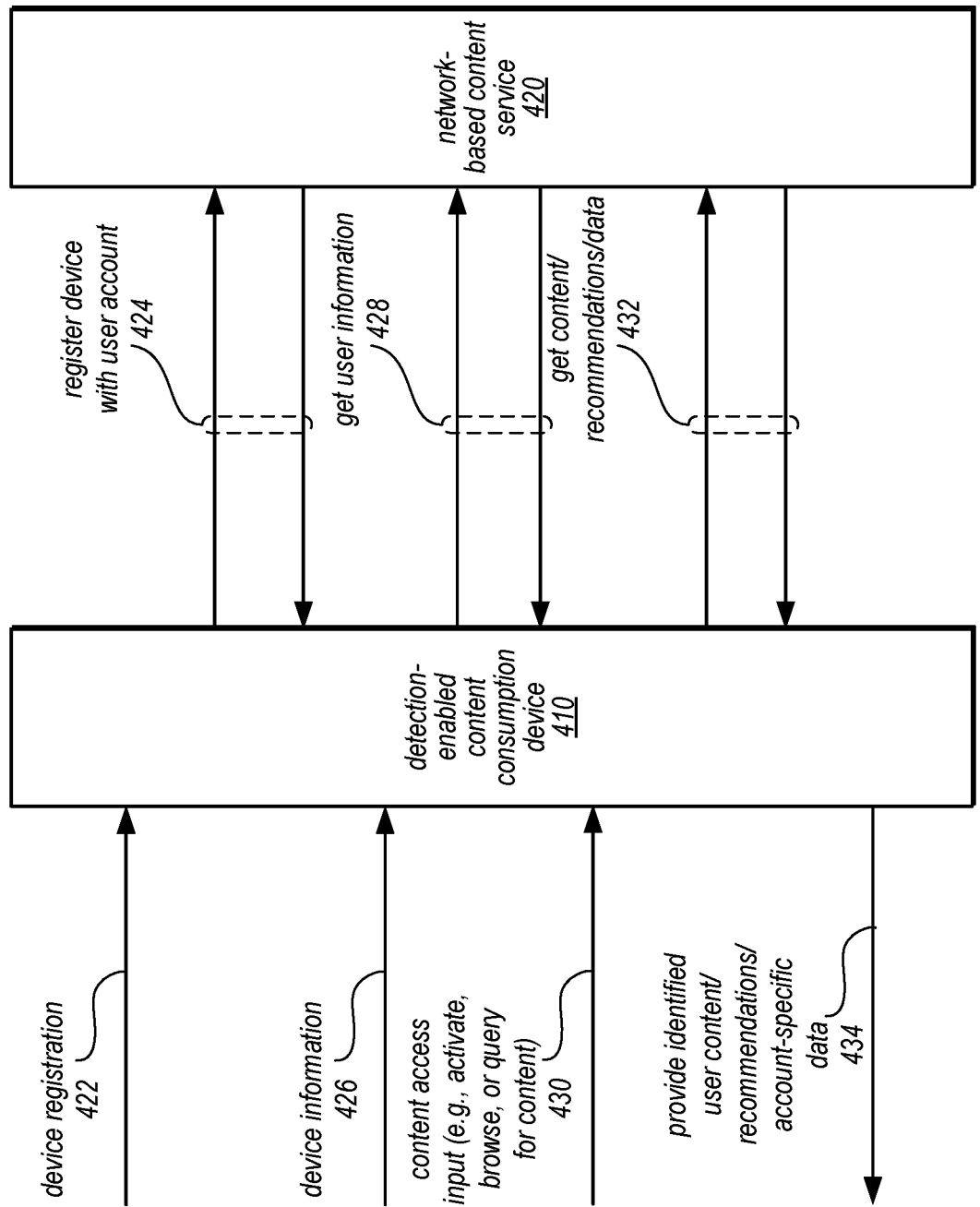
FIG. 4 is a logical block diagram illustrating interactions between a content consumption device and a network-based content service, according to some embodiments.

FIG. 4 is a logical block diagram illustrating interactions between a content consumption device and a network-based content service, according to some embodiments. As discussed above with regard to FIG. 2, a content consumption device may implement interface(s) to receive the various inputs, indications, requests, and other information illustrated in FIG. 4. In some embodiments, device registration requests may be sent to detection-enabled content consumption device 410 in order to create a link or association between an identifying device and a user account. In some embodiments, a local data store at detection-enabled content consumption device 410 may be updated to create the link or mapping between the identifying device (e.g., a device identifier) and the user account. As illustrated in FIG. 4, in some embodiments, detection-enabled content consumption device 410 may be configured to send requests to register the identifying device with the user account 424 to network-based content service 420.

As discussed above with regard to FIGS. 1-2, and below with regard to FIGS. 5-6, device information may be received at detection-enabled content consumption device via one or more wireless communications. For example, identifying devices may advertise device information to a surrounding area via BLE and detection enabled content consumption device 410 may receive the device information. Device information 426 may also be received in response to a request for device information sent from detection-enabled content consumption device 410 (not illustrated). A determination may be made as to whether an identifying device is within consumption proximity of detection-enabled content consumption device 410. If an identifying device is within consumption proximity, then a user account linked to or associated with the identifying device may be selected. In some embodiments, the link or mapping information may be stored locally at detection-enabled content consumption device allowing for offline user detection and/or content access (if a back-end network-based content service is unavailable). In some embodiments, as illustrated in FIG. 4, detection-enabled content consumption device 410 may get user information 428 from network-based content service 420 to identify and select a linked user account. For example the request may include an identifier unique to the identifying device and request user account information for user accounts linked to or associated with the identifier. In at least some embodiments, an identifying device may be detected within consumption proximity and a guest or temporary account may be setup (e.g., locally maintained at the detection-enabled content consumption device) so that access may be provided that accounts for the unknown identifying device (e.g., a user and a guest each with identifying devices are present within consumption distance, content access may be provided as for a group of users rather than an individual user even though it may be that one of the users is unknown).

Content access input 430 may be received at detection-enabled content consumption device 410, in some embodiments. Content access input 430 may be various kinds of input to access content via detection-enabled content consumption device 410. For example, the access input may be to activate or turn on detection-enabled content consumption device (e.g., device 410 may handle device information 426 and request user information 428 while in an inactive state, in some embodiments). The access input may be to select content, browse content, query content, or request content recommendations. In order to handle the various content access input 430, detection-enabled content consumption device 410 may access a local store of data maintaining account specific data for the user account (e.g., account settings, privileges, controls, behavioral history, etc.) to perform various actions, such as changing account settings, or generating content recommendations. In some embodiments, content, recommendations, and/or data 432 may be requested and received from network-based content service 420 in order to provide identified user content, recommendations, and/or account-specific data 434 to a user.

The various embodiments of a content consumption device and/or a network-based service implementing device-enabled identification for automated user detection described with regard to FIGS. 2-4 above, may implement one or more different techniques described below with regard to FIGS. 5-6. However, various other kinds of content consumption devices or systems may implement device-enabled identification for automated user detection. For example, a content consumption device may maintain local data stores to maintain user account data and/or content. FIG. 5 is a high-level flowchart illustrating methods and techniques for implementing device-enabled identification for automated user detection, according to some embodiments. Different combinations of systems and/or devices may implement the various techniques discussed below.

As indicated at 510, an identifying device may be detected within consumption proximity of a content consumption device, in various embodiments. Identifying devices may act as a proxy for the presence of a user/owner/operator/possessor of the identifying devices. An identifying device may be any mobile computing device, wearable computing device, or other device capable of communicating device information that may be wirelessly received at a content consumption device. For example, an identifying device may be a mobile phone, a tablet computer, laptop or smartwatch configured to actively broadcast device information. In some embodiments, an identifying device may not be active, but may passively provide device information (e.g., in response to a request signal or other communication from a content consumption device). For example, passive Radio Frequency Identification (RFID) tags may be embedded or implemented on various items which may be carried by user (e.g., credit cards with embedded RFID tags).

In at least some embodiments, device information may be received at a content consumption device via one or more wireless communications from an identifying device. For example, various types of radio wave communication protocols and techniques (e.g., Bluetooth, Bluetooth Low Energy (BLE), Z-Wave, ZigBee, XBee), infrared communications, Wi-Fi communications, or any other Wireless Personal Area Network (WPAN) communications may be utilized to provide device information between identifying devices and a content consumption device. Identifying devices may, in some embodiments, be configured to broadcast device information (e.g., an application or component implemented on an identifying device may be configured to proactively advertise the device over wireless communication protocols), or provide device information in response to requests from a content consumption device. In at least some embodiments, proximity sensing may be performed based upon the device information to determine a distance between a content consumption device and an identifying device. For example, signal strength of device information communicated between the content consumption device and the identifying device may be measured to determine the distance (e.g., a Received Signal Strength Indicator (RSSI) value). Content consumption devices may be any device configured to provide access to content according to a user account for the content (e.g., various content streaming systems or devices, specially configured computing resources, fixed position or mobile devices, such as system 1000 in FIG. 7).

In at least some embodiments, a determination may be made as to whether identifying devices are within a consumption proximity of the content consumption device. Consumption proximity may indicate a distance range, or other location or area (e.g., defined by a geofence) within which a user may consume (e.g., play, listen to, view, interact with) content. As content may be various forms of media, static or interactive (e.g., games, applications, videos, music, etc.), the consumption proximity may be based on the form of content to which access is provided. For example, if the content is video or audio content, then consumption proximity may defined to include locations in the same room as the content consumption device (e.g., a room where a television or other content output device is located). Consumption proximity determinations may, in some embodiments, be made according to whether an identifying device is located within the area defined by consumption proximity (e.g., whether an identifying is located within a certain distance from the content consumption device). In at least some embodiments, multiple different locality rule(s) may be evaluated and/or applied to device information to determine whether a device is within consumption proximity. For example, in addition to the proximity or distance between the identifying device and the content consumption device, information about the device, such as identifying device state (e.g., on, inactive, charging) may be received. Locality rule(s) may describe valid or invalid device states, indicating those devices which may be within a described range or location but are to be ignored due to current state, for example. Applying locality rule(s) to device information may be performed according to various weightings or hierarchies, such that certain locality rules may be applied in the event of conflicting results for a consumption proximity determination.

For an identifying device that is detected within consumption proximity to a content consumption device, a determination may be made as to whether a user account is linked to or associated with the identifying device, as indicated at 520. For example, a local data store, such as an index, may be maintained, which contains mappings between identifying devices (e.g., device identifiers) and user accounts. Similarly, as discussed above with regard to FIGS. 2-4, in some embodiments, a network service or remote data store may maintain mappings between identifying devices and user accounts. If no user account is linked to or associated the detected identifying device, as indicated by the negative exit from 520, a device registration interface to link or associate the detected identifying device with a user account may be provided, as indicated at 522, in some embodiments.

For example, a display or other output device may request a user account name and/or password to register or link the detected device with a user account. In some embodiments, the identifying device itself may be directed to provide or display the user account registration interface (e.g., on a mobile phone display). In some embodiments, the identifying device may be linked to or associated with another identifying device, which is associated with a particular user account (e.g., a mobile phone is linked to or associated with an account that is also linked to or associated with a tablet computer—detection of the tablet computer may be used to determine that the same access should be granted as with the user account linked to or associated with the mobile phone).

If one or more user account(s) are determined to be linked to or associated with the identifying device, as indicated by the positive exit from 520, then selection of a user account linked to or associated with the identifying device may be made. For example, as illustrated by the negative exit from 530, if only a single user account is linked to or associated with the identifying device, then the single user account may be automatically selected. In this way, identifying devices that are personal or unique to a particular user may provide automated user account selection at a content consumption device. Once selected, access to content via the content consumption device may be provided according to the selected user account, as indicated at 542. For instance, access privileges, content restrictions, payment information, historical content access data, and other information specific to the selected user account may be utilized to provide content access. In at least some embodiments, content recommendations (e.g., video recommendations, game recommendations, application recommendations, or audio recommendations) may be provided via the content consumption device (e.g., visually or audibly presented) that are based on historical content access data specific to the user account (e.g., past content selected/consumed, content reviews associated with the user account, etc.). In some embodiments, some content may be blocked, or otherwise prevent from access, according content controls or settings specific to the user account. For example, parental controls may impose content rating limitations to block user accounts for minor users from accessing mature content. Access may be provided, in some embodiments, without further manual input from a user. User account information may be automatically displayed or provided. In some embodiments, other detected devices (event if not in consumption proximity) may be displayed or otherwise indicated.

In some embodiments, as indicated by the positive exit from 530, multiple user accounts may be linked to or associated with an identifying device. For example, a household laptop or tablet computing device may be utilized by multiple different users. In this scenario, a user account selection interface may be provided, as indicated at 532. For example an interface may display list of user accounts, prompting the selection of one of the user accounts. Other forms of account selection may include voice or visual recognition of a user (e.g., via audio/visual sensors) or some other form of identification. In some embodiments, the user selection interface may be provided at the identifying device (e.g., on a tablet display). A selection of a user account may be received via the user account selection interface, as indicated at 534. Once selected, access to content via the content consumption device may be provided as discussed above.

In some scenarios, other users may be present within consumption proximity of a consumption device, as indicated by the positive exit from 540. These other users may be detected according to the various techniques described above based on an identifying device. However, user accounts may also be manually entered as opposed to being automatically selected in some embodiments. Thus access may be provided for content consumption via the content consumption device according to the user account and the other user accounts, as indicated at 550. For example, content recommendations may be provided based analyzing on historical data content access data for each of the selected user accounts, in some embodiments. Content restrictions, for example, may be enforced even if only required for one of the detected user accounts. By providing content access according to multiple detected user accounts, content access may dynamically adjust according to the presence of users in the room without manual input. For instance, if a user account for an adult with unrestricted access is selected, and a child user account is detected upon a child possessing an identifying device entering the room containing the content consumption device, then the content consumption device may automatically modify content recommendations displayed to account for content restricts associated with the child user account. In some embodiments, a social graph or association between user accounts detected as present at the same time may be created (e.g., creating a group profile). In some embodiments, a content consumption device may interface or communicate with other control systems or device to indicate the presence of a user at particular location (e.g., notify a lighting control system that a user is present in the room and to turn on the lights in the room). In some embodiments, a master, owner, or parental user account may be detected which may allow the owner account to control other detected devices (even if the other detected devices are not within consumption proximity). For example, a detected user account that is a parental account may utilize content consumption system to disable or block detected child identifying devices from current and/or future actions (e.g., disabling devices for an evening).

In some embodiments, the techniques described above with regard to FIG. 5 may be implemented to proactively configure a content consumption device when an identifying device is detected within consumption proximity, even if the content consumption device is not actively being utilized. For example, the selected user account may be preloaded onto the content consumption device so that when the content consumption device is activated, a user experience may be provided that is already specific to the selected user account. Similarly the techniques described above with regard to FIG. 5, may be used to switch between user accounts automatically without manual input. For example, if one user account is currently selected for a content consumption device and a new identifying device is detected within consumption proximity, the current user account may be logged out and a new user account linked to or associated with the new identifying device logged in, so that content access may be provided without regard to the previous user account.

Device-enabled identification for automated user identification may be implemented to reduce user burdens from manually providing information whenever a user wishes to access content via a content consumption device according to a particular user profile. A similar burden may be incurred when a user no longer wishes to access content or moves out of consumption proximity. Therefore, similar techniques to detect when users are no longer accessing content or moving out of consumption proximity may be implemented. FIG. 6 is a high-level flowchart illustrating methods and techniques for identifying devices leaving consumption proximity of a content consumption device, according to some embodiments.

As indicated at 610 an identifying device may be detected leaving consumption proximity of a content consumption device, in some embodiments. For example, a user with an identifying device on his person (e.g., a mobile phone in a pocket, an RFID-enabled credit card, or a smartwatch) may leave a room, walk away from a content output (e.g., media display or speakers), or otherwise move the identifying device outside of consumption proximity. Just as detecting identifying devices within consumption proximity may be performed, in some embodiments, by applying locality rule(s) so too the locality rule(s) may be applied to determine when an identifying device is outside consumption proximity. Consider the above example, where the identifying device is moved, a range or distance boundary between the identifying device and the content consumption device as described in a locality rule may be exceeded. Some locality rules may be specific to determining that an identifying device is not within consumption proximity. For instance, if a device is in a charging, sleeping, or powered off state, then the identification device may be considered outside consumption proximity. As discussed above with regard to FIG. 5, locality rules may be applied hierarchically or according to some weighting schema (e.g., charging identification devices may not be considered within consumption proximity no matter the distance between the identification device and the content consumption device). Locality rules and other determinations as to whether an identification device left consumption proximity may be made based on device information that is received at a content consumption device via one or more wireless communications from the identifying device, in various embodiments, akin to the device information discussed above with regard to FIG. 5.

Users may be present within consumption proximity alone, or may only utilize a single user account to access content. Thus, as indicated by the negative exit from 620, in some embodiments, a responsive action to change content access may be performed in response to detecting that the identifying device left consumption proximity, as indicated at 630. For example, content access may be halted or paused (e.g., an ongoing video may be paused) in response to detecting that the identifying device is no longer within consumption proximity (inferring that a user is not currently listening, watching, interacting or otherwise consuming the content). In some embodiments, the user account linked to or associated with the identifying device may be logged out, removed, or otherwise no longer be used to provide content access. If, for example, the user account is logged out, then no additional purchases, rentals, views, downloads, or other access inputs may be authorized or allowed without logging into a valid account. A default account, profile, or other means of access to content via the content consumption device may be selected as a responsive action, in some embodiments.

As indicated by the positive exit from 620, other identifying device(s) may remain within consumption proximity of the content consumption device, in some embodiments. Therefore, as indicated at 640, content access may be provided according to user account(s) linked to or associated with the remaining identifying device(s), in some embodiments. For example, as discussed above with regard to FIG. 5, multiple user accounts may be combined or compared to create a group profile based on the user accounts of detected identifying devices within consumption proximity.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of recommendation engines, model generation components, data stores and/or other components that implement the network-based content services, systems, or services described herein). The various methods as illustrated in the figures and described herein represent example embodiments of methods. The order of any method may be changed, and various elements may be added, reordered, combined, omitted, modified, etc.

Figure 7:
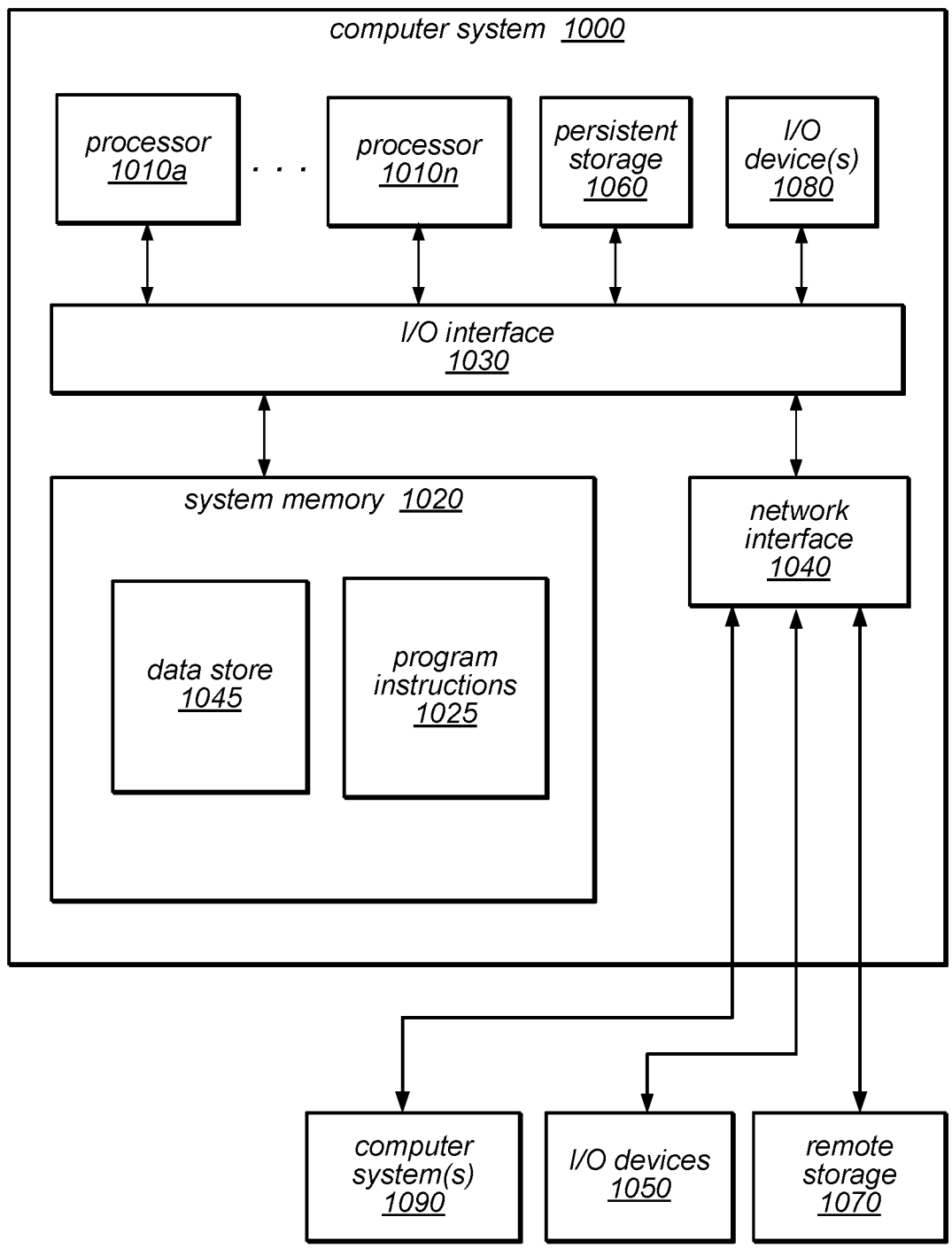
FIG. 7 is an example computer system, according to various embodiments.

FIG. 7 is a block diagram illustrating a computer system configured to implement device-enabled identification for automated user detection, according to various embodiments. For example, computer system 1000 may be configured to implement a content consumption device and/or a network-based service, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a real-time item recommendation engine (or module or component thereof), one or more computing systems, servers or nodes implementing a network-based content service, or storage systems that store the item selection data and/or the item recommendation model, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by persistent storage, such as the item selection data or the item recommendation model described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, data storage configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, enterprise system nodes, and/or clients of the network-based content service systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the system embodiments described herein, or any of their components, may be implemented as one or more network-based services, which may or may not be distributed. For example, a real-time item recommendation may be implemented an a network-based content service that employs the systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   one or more hardware processors and memory configured to:
   determine, by a content consumption device based on device information received at the content consumption device via a wireless interface from an identifying device that the identifying device is within proximity of the content consumption device, wherein the identifying device is distinct from the content consumption device;
   determine, at the content consumption device based on device state information received at the content consumption device, a device state of the identifying device;

receive, at the content consumption device, an identifier from the identifying device, wherein the identifier is distinct from the device state information;
determine, at the content consumption device to:
provide content recommendations based on the identifier responsive to:
the determination that the identifying device is within proximity of the content consumption device, and
the determined device state of the identifying device being a valid state; and
ignore the identifier for providing the content recommendations responsive to:
the determination that the identifying device is within proximity of the content consumption device, and
the determined device state of the identifying device being an invalid state; and
responsive to the determination to provide the content recommendations:
determine the content recommendations based, at least in part, on historical content access data specific to the identifier; and
provide data indicating the content recommendations for display via the content consumption device.

2. The system of claim 1, wherein to determine that the identifying device is within proximity of the content consumption device, the one or more hardware processors and memory are configured to apply one or more locality rules to the device information received from the identifying device.

3. The system of claim 1, further comprising:
a network interface,
wherein the one or more hardware processors and memory are further configured to request identification of a user account associated with the identifying device, from a network-based content service via the network interface based, at least in part, on the identifier.

4. The system of claim 3, wherein the one or more hardware processors and memory are further configured to:
receive identification of the user account from the network-based content service via the network interface responsive to the request; and
provide access for content consumption according to the user account.

5. The system of claim 3, wherein the one or more hardware processors and memory are further configured to:
detect another identifying device within proximity of the content consumption device;
wherein in response to detecting the other identifying device, the one or more hardware processors and memory are further configured to:
determine that no user account is associated with the detected other identifying device; and
provide a device registration interface in order to associate the other identifying device with a user account.

6. The system of claim 1, wherein the one or more hardware processors and memory are further configured to prevent access to particular content for consumption via the content consumption device.

7. A method, comprising:
performing, by one or more devices comprising respective processors and memory:
determining, by a content consumption device based on device information received at content consumption device via a wireless interface from an identifying device that the identifying device is within proximity of the content consumption device, wherein the identifying device is distinct from the content consumption device;
determining, at the content consumption device based on device state information received at the content consumption device, a device state of the identifying device;
receiving, at the content consumption device, an identifier from the identifying device, wherein the identifier is distinct from the device state information;
determining, at the content consumption device to provide content recommendations based on the identifier responsive to:
the determination that the identifying device is within proximity of the content consumption device, and
the determined device state of the identifying device being a valid state;
determining at the content consumption device, for a different identifying device within proximity of the content consumption device, based on a device state of the different identifying device distinct from an identifier received from the different identifying device, to ignore the different identifying device for providing content recommendations;
responsive to the determination to provide the content recommendations based on the identifier of the identifying device:
determining the content recommendations based, at least in part, on historical content access data specific to the identifier; and
providing data indicating the content recommendations for display via the content consumption device.

8. The method of claim 7, wherein determining that the identifying device is within proximity of the content consumption device comprises:
receiving device information via one or more wireless communications from the identifying device; and
applying one or more locality rules to the device information to determine that the identifying device is within proximity of the content consumption device.

9. The method of claim 7, further comprising:
requesting, based at least in part based on the identifier associated with the identifying device, identification of a user account associated with the identifying device, from a network-based content service via a network interface, the network-based service configured to provide content associated with the user account.

10. The method of claim 9, further comprising:
receiving identification of the user account from the network-based content service via the network interface responsive to the request; and
providing access for content consumption according to the identified user account.

11. The method of claim 9, further comprising:
detecting another identifying device within proximity of the content consumption device;
in response to detecting the other identifying device:
determining that no user account is associated with the detected other identifying device; and
providing a device registration interface via the content consumption device in order to associate the other identifying device with a user account.

12. The method of claim 10, wherein the method further comprises:
receiving, from the network-based content service, one or more other user accounts of respective ones of one or more identifying devices detected within proximity of the content consumption device; and
wherein access for content consumption is provided according to the one or more other user accounts.

13. The method of claim 7, further comprising preventing access to particular content for consumption via the content consumption device.

14. The method of claim 7, wherein the identifying device is a mobile computing device.

15. One or more non-transitory, computer-readable storage media storing program instructions that when executed one or across one or more computing devices cause the one or more computing devices to implement:
determining, by a content consumption device based on device information received at content consumption device via a wireless interface from an identifying device that the identifying device is within proximity of the content consumption device, wherein the identifying device is distinct from the content consumption device;
determining, at the content consumption device based on the device state information received at the content consumption device, a device state of the identifying device;
receiving, at the content consumption device, an identifier from the identifying device, wherein the identifier is distinct from the device state information;
determining, at the content consumption device to provide content recommendations based on the identifier responsive to:
the determination that the identifying device is within proximity of the content consumption device, and
the determined device state of the identifying device being a valid state; and
determining at the content consumption device, for a different identifying device within proximity of the content consumption device, based on a device state of the different identifying device distinct from an identifier received from the different identifying device, to ignore the different identifying device for providing content recommendations; and
responsive to the determination to provide the content recommendations based on the identifier of the identifying device:
determining the content recommendations based, at least in part, on historical content access data specific to the identifier; and
providing data indicating the content recommendations for display via the content consumption device.

16. The one or more non-transitory, computer-readable storage media of claim 15, wherein determining that the identifying device is within proximity of the content consumption device comprises:
receiving device information via one or more wireless communications from the identifying device; and
applying one or more locality rules to the device information to determine that the identifying device is within proximity of the content consumption device.

17. The one or more non-transitory, computer-readable storage media of claim 15, storing additional program instructions that when executed on or across the one or more computing devices cause the one or more computing devices to implement:
requesting, based at least in part based on the identifier associated with the identifying device, identification of a user account associated with the identifying device, from a network-based content service via a network interface, the network-based service configured to provide content associated with the user account.

18. The one or more non-transitory, computer-readable storage media of claim 17, storing additional program instructions to implement:
receiving identification of the user account from the network-based content service via the network-based interface responsive to the request; and
providing access for content consumption according to the identified user account.

19. The one or more non-transitory, computer-readable storage media of claim 18, wherein providing access for content consumption via the content consumption device according to the determined user account comprises configuring the content consumption device to provide content access prior to receiving content access input at the content consumption device.

20. The one or more non-transitory, computer-readable storage media of claim 17, storing additional program instructions that when executed on or across the one or more computing devices cause the one or more computing devices to implement:
requesting one or more other user accounts for respective identifying devices detected within proximity of the content consumption device; and
wherein access for content consumption is provided according to the user account and the one or more other user accounts.

* * * * *